(12) United States Patent
Brauel et al.

(10) Patent No.: US 8,479,255 B2
(45) Date of Patent: Jul. 2, 2013

(54) MANAGING OPERATIONAL REQUIREMENTS ON THE OBJECTS OF A SERVICE ORIENTED ARCHITECTURE (SOA)

(75) Inventors: Björn Brauel, Mühltal (DE); Harald Schöning, Dieburg (DE)

(73) Assignee: Software AG, Darmstadt (DE)

( * ) Notice: Subject to any disclaimer, the term of this patent is extended or adjusted under 35 U.S.C. 154(b) by 925 days.

(21) Appl. No.: 12/031,441

(22) Filed: Feb. 14, 2008

(65) Prior Publication Data

US 2008/0229195 A1    Sep. 18, 2008

(30) Foreign Application Priority Data

Mar. 14, 2007    (EP) .................................. 07005278

(51) Int. Cl.
    G06F 17/00    (2006.01)
(52) U.S. Cl.
    USPC .............................. 726/1; 717/116; 717/117
(58) Field of Classification Search
    USPC .................. 715/744, 762; 726/3; 717/116
    See application file for complete search history.

(56) References Cited

U.S. PATENT DOCUMENTS

| | | | |
|---|---|---|---|
| 5,386,556 A * | 1/1995 | Hedin et al. | 1/1 |
| 6,868,413 B1 * | 3/2005 | Grindrod et al. | 706/59 |
| 7,627,891 B2 * | 12/2009 | Williams et al. | 726/1 |
| 2003/0088858 A1 | 5/2003 | Minerley | |
| 2003/0110192 A1 | 6/2003 | Valente et al. | |
| 2003/0135759 A1 | 7/2003 | Kim et al. | |
| 2005/0257267 A1 | 11/2005 | Williams et al. | |
| 2006/0075466 A1 * | 4/2006 | Ramanathan et al. | 726/1 |
| 2006/0159241 A1 * | 7/2006 | Jagdish et al. | 379/88.16 |

OTHER PUBLICATIONS

"Understanding Service-Oriented Architecture" by David Sprott and Lawrence Wilkes, CBDI Forum, Jan. 2004, http://msdn.microsoft.com/en-us/library/aa480021.aspx.*
Alfred V. Aho, Ravi Sethi, Jeffrey D. Ullman; "Compilers: Principles, Techniques, and Tools"; Addison-Wesley; 1986; 12 pages.
European Search Report dated Sep. 6, 2007; 2 pages.

* cited by examiner

Primary Examiner — Ramsey Refai
Assistant Examiner — Di Xiao
(74) Attorney, Agent, or Firm — Meyertons Hood Kivlin Kowert & Goetzel, P.C.; Jeffrey C. Hood; Joel L. Stevens

(57) ABSTRACT

A registry for a service oriented architecture (SOA) comprising a plurality of processing objects. The registry may include a plurality of non-formalized operation requirements for the plurality of SOA objects, a plurality of technical assertions for the plurality of SOA objects, and a plurality of links, linking each non-formalized operation requirement to at least one technical assertion of the registry.

12 Claims, 4 Drawing Sheets

Figure 1:
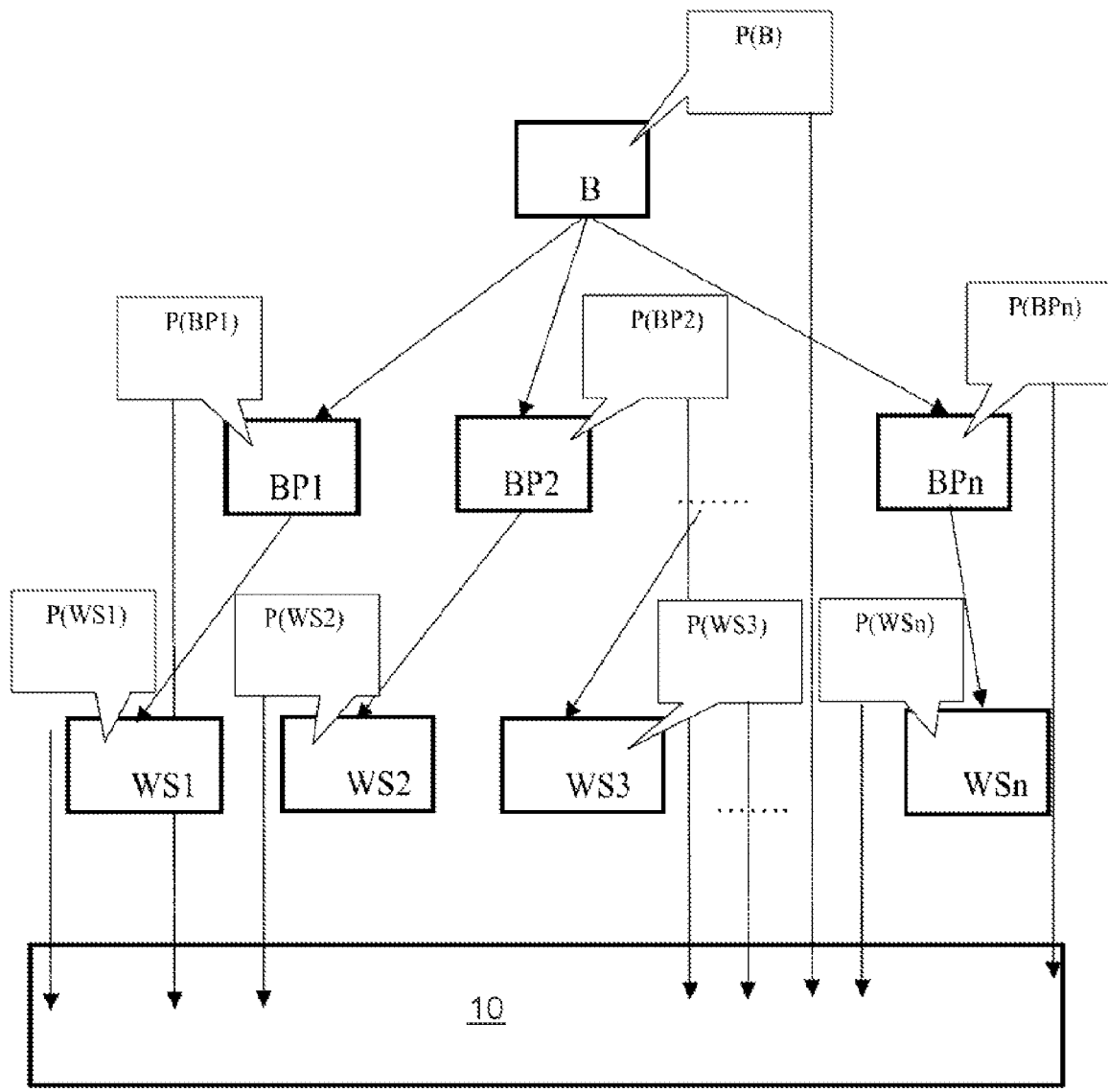

```
<wsdl:definitions name="StockQuote"
targetNamespace="http://www.fabrikam123.example.com/stock/binding"
    xmlns:tns="http://www.fabrikam123.example.com/stock/binding"
xmlns:fab="http://www.fabrikam123.example.com/stock"
    xmlns:rmp="http://schemas.xmlsoap.org/ws/2005/02/rm/policy"
    xmlns:sp="http://schemas.xmlsoap.org/ws/2005/07/securitypolicy"
xmlns:wsdl="http://schemas.xmlsoap.org/wsdl/"
    xmlns:wsoap12="http://schemas.xmlsoap.org/wsdl/soap12/"
xmlns:wsp="http://schemas.xmlsoap.org/ws/2004/09/policy"
    xmlns:wsu="http://docs.oasis-open.org/wss/2004/01/oasis-200401-wss-wssecurity-utility-
1.0.xsd" >
  <wsp:Policy wsu:Id="RmPolicy" >
   <rmp:RMAssertion>
    <rmp:InactivityTimeout Milliseconds="600000" />
    <rmp:BaseRetransmissionInterval Milliseconds="3000" />     15
    <rmp:ExponentialBackoff />
    <rmp:AcknowledgementInterval Milliseconds="200" />
   </rmp:RMAssertion>
  </wsp:Policy>
  <wsp:Policy wsu:Id="X509EndpointPolicy" >
   <sp:AsymmetricBinding>
    <wsp:Policy> <!-- Details omitted for readability -->
     <sp:IncludeTimestamp />
     <sp:OnlySignEntireHeadersAndBody />
    </wsp:Policy>
   </sp:AsymmetricBinding>
  </wsp:Policy>
  <wsp:Policy wsu:Id="SecureMessagePolicy" >
   <sp:SignedParts>
    <sp:Body />
   </sp:SignedParts>
   <sp:EncryptedParts>
    <sp:Body />
   </sp:EncryptedParts>
  </wsp:Policy>
  <wsdl:import namespace="http://www.fabrikam123.example.com/stock"
        location="http://www.fabrikam123.example.com/stock/stock.wsdl" />
  <wsdl:binding name="StockQuoteSoapBinding" type="fab:Quote" >
   <wsoap12:binding style="document" transport="http://schemas.xmlsoap.org/soap/http" />
   <wsp:PolicyReference URI="#RmPolicy" wsdl:required="true" />
   <wsp:PolicyReference URI="#X509EndpointPolicy" wsdl:required="true" />
   <wsdl:operation name="GetLastTradePrice" >
    <wsoap12:operation
soapAction="http://www.fabrikam123.example.com/stock/Quote/GetLastTradePriceRequest" />
    <wsdl:input>
     <wsoap12:body use="literal" />
     <wsp:PolicyReference URI="#SecureMessagePolicy" wsdl:required="true" />
    </wsdl:input>
    <wsdl:output>
     <wsoap12:body use="literal" />
     <wsp:PolicyReference URI="#SecureMessagePolicy" wsdl:required="true" />
    </wsdl:output>
   </wsdl:operation>
  </wsdl:binding>
</wsdl:definitions>
```

*FIG. 2*

MANAGING OPERATIONAL REQUIREMENTS ON THE OBJECTS OF A SERVICE ORIENTED ARCHITECTURE (SOA)

PRIORITY CLAIM

This application claims benefit of priority of European application no. 07 005 278.2 titled "Registry for Managing Operational Requirements on the Objects of a Service Oriented Architecture (SOA)", filed Mar. 14, 2007, and whose inventors are Björn Brauel and Harald Schöning.

INCORPORATED BY REFERENCE

European application no. 07 005 278.2 titled "Registry for Managing Operational Requirements on the Objects of a Service Oriented Architecture (SOA)", filed Mar. 14, 2007, and whose inventors are Björn Brauel and Harald Schöning, is hereby incorporated by reference in its entirety as though fully and completely set forth herein.

TECHNICAL FILED

The present invention relates to method for managing operational requirements of a service oriented (software) architecture (SOA).

DESCRIPTION OF THE RELATED ART

In a service oriented (software) architecture (SOA), various processing objects are made available to a user in the network as independent services that can be accessed in a standardized way. The objects of the SOA interoperate based on formal definitions which are independent from the underlying hardware and software platform and programming language. The interface definition encapsulates the specific implementations. An SOA is independent of a specific development technology (such as Java and *NET). As a result, the software objects become very reusable because the interfaces are standards-compliant and independent from the underlying implementation of the processing logic. For example, a C# (C Sharp) service could be used by a JAVA application and vice versa. Most definitions of a SOA use SOAP requests conveyed via HTTP/HTTPS over TCP/IP. However, a SOA may use any service-based technology.

Managing a SOA is a complex and difficult task. Maintaining an overview of the whole landscape of processing objects such as web services, some of which may dynamically change over time, is important to assure that an application using the various processing objects properly operates. Applicant of the present invention has therefore developed a centralized registry/repository available under the trade name CentraSite™.

CentraSite is a centralized registry, comprising descriptions of the processing objects, in particular the web services of an SOA. The web services can be described by a Web Services Description Language (WSDL) file. The WSDL file typically contains information about the function, the data, the data type, and the exchange protocols of the respective web service. A client intending to send a request to a certain web service can obtain the WSDL file either from the web service itself or from CentraSite to find out how to access the web service. CentraSite provides various APIs for accessing the information stored in the registry and for its management.

In addition to performing their respective processing operation, the objects of a SOA have to meet additional operational requirements relating, for example, to the quality of service (e.g., a certain response time to a request or the data throughput of the process per time unit), access restrictions (e.g., only a certain restricted set of user and/or computer systems are allowed to execute a process), requirements on the procedure to authenticate participants, etc. There may also be operational requirements on the life cycle of an SOA object, such as "a process must not be changed twice within a week" or "a process must not be used in production unless tested for at least four weeks".

The higher a processing object is located in the abstraction hierarchy of the SOA (e.g., a user application as opposed to an infrastructural web service), the more likely it is that these additional requirements are stated in the terms of a high-level user rather than in the precise technical terms of an IT system engineer. On the higher level, a typical method to express such requirements is the use of a non-formalized word processing document. However, to be able to technically enforce such non-formalized requirements, they have to be reflected in concrete technical assertions or rules governing the actual processing by using for example a web service policy framework.

Correlating the non-formalized requirements with the correct technical assertions (for example, for specifying an upper limit for a response time for a process) generally requires experienced IT personnel. This applies all the more, since for each field of technical assertions (e.g., processing performance, authentication, authorization, encryption, etc.) another enforcement method might be in place requiring a different and often proprietary technique to express the assertions. It is apparent that it is therefore quite difficult to map the non-formalized requirements to the correct technical assertions for the various processing objects of the SOA.

A related difficulty is the continuous adaptation of the created technical assertions for the SOA objects to changing needs. In the prior art, the technical assertions are typically stored in a decentralized manner, making it even harder to modify them or to even investigate whether they really reflect the original non-formalized operation requirements.

US Publication No. 2002/0188627 discloses data elements which are subject to one or more policies. The policies can be expressed in two formats, namely HTML and XML. Both of these representations are highly structured and are only useful for a skilled IT expert, if a modification of any of the policies becomes necessary.

Accordingly, improvements in formalizing operational requirements in an SOA are desirable.

SUMMARY OF THE INVENTION

Various embodiments are presented of a method for managing operational requirements of a service oriented (software) architecture (SOA).

In one embodiment, a registry for an SOA may be used that includes a plurality of processing objects, the registry including a plurality of non-formalized operation requirements for the plurality of SOA objects, a plurality of technical assertions for the plurality of SOA objects and a plurality of links, linking each non-formalized operation requirement to at least one technical assertion of the registry.

Accordingly, in addition to containing the non-formalized operational requirements on the one hand and the technical assertions relating to the processing objects of the SOA on the other hand, the registry may link the elements of the two groups. As a result, even a high-level user can control the operation of the processing objects of the SOA by referring only to the non-formalized operation requirements without having to perform any low-level implementations of the technical assertions.

In one example, the registry may include, for each link, an intermediate representation of the respective non-formalized operation requirement. The intermediate representation may be still readable but more structured than the non-formalized operation requirement. It can therefore be understood by both, low-level IT personnel and high-level users of the registry trying to adapt the processing requirements for the objects of the SOA.

According to a further aspect, the registry may include a graphical user interface (GUI) presenting at least one non-formalized operation requirement and an intermediate representation of at least one linked technical assertion. Such a unique GUI of the registry may facilitate the modification of the technical assertions and the related operation requirements on the objects of the SOA. The graphical user interface may be, in one embodiment, adapted to present at least two technical assertions linked to the same non-formalized operation requirement, wherein the at least two technical assertions can be combined by Boolean expressions. Using Boolean expressions, a user can easily define complex operational requirements for the various SOA objects without any skill in the low-level coding of technical assertions for the processing of the objects of the SOA.

Furthermore, the registry can comprise at least one link linking a single non-formalized operation requirement to technical assertions valid for a plurality of SOA objects. Such a one-to-many link in the registry shortens the overall definition time for the technical assertions for all SOA objects by a high-level user.

Various embodiments further relate to a method for linking a plurality of non-formalized operation requirements for the objects of a SOA to a plurality of technical assertions for the SOA, wherein the method may include the use of a registry of any of the above described embodiments.

SHORT DESCRIPTION OF THE DRAWINGS

Figure 3:
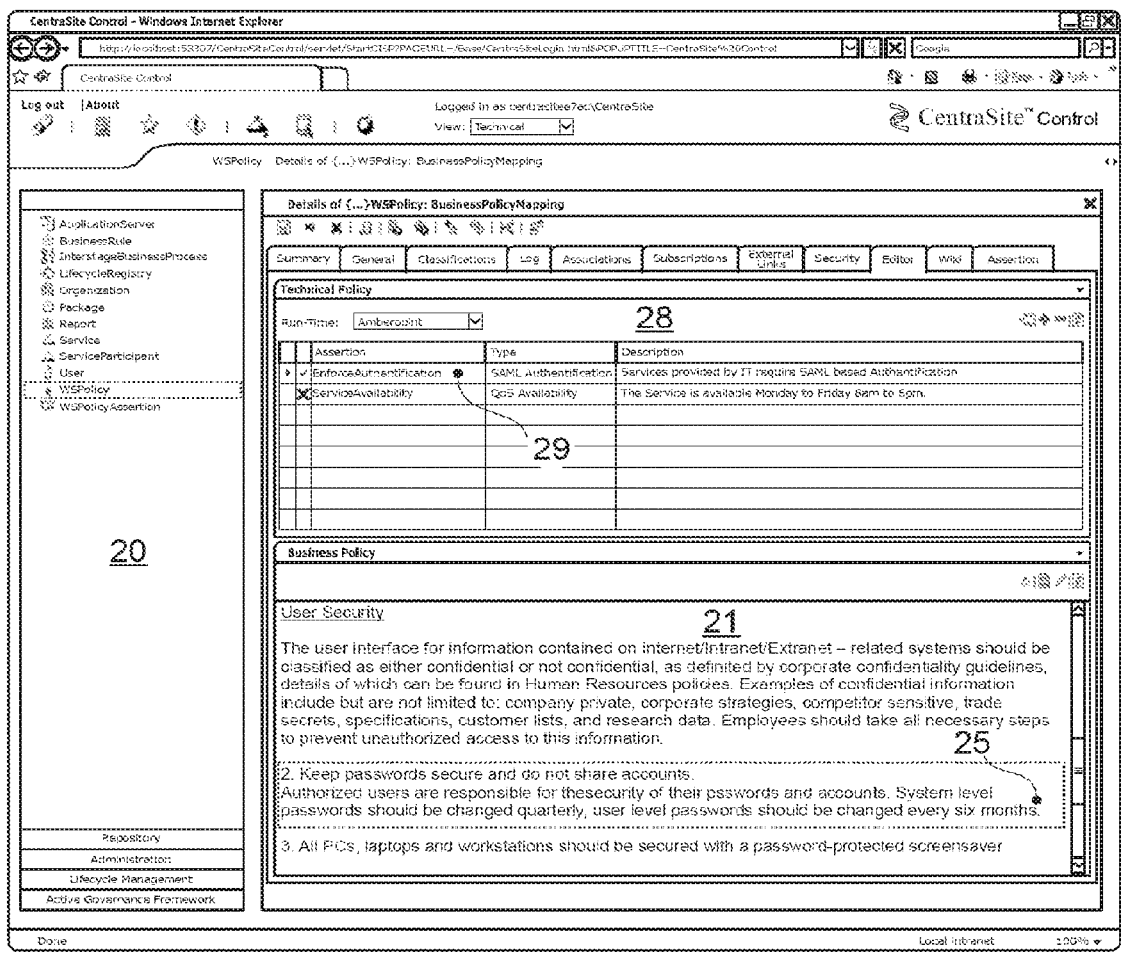
Figure 4A:
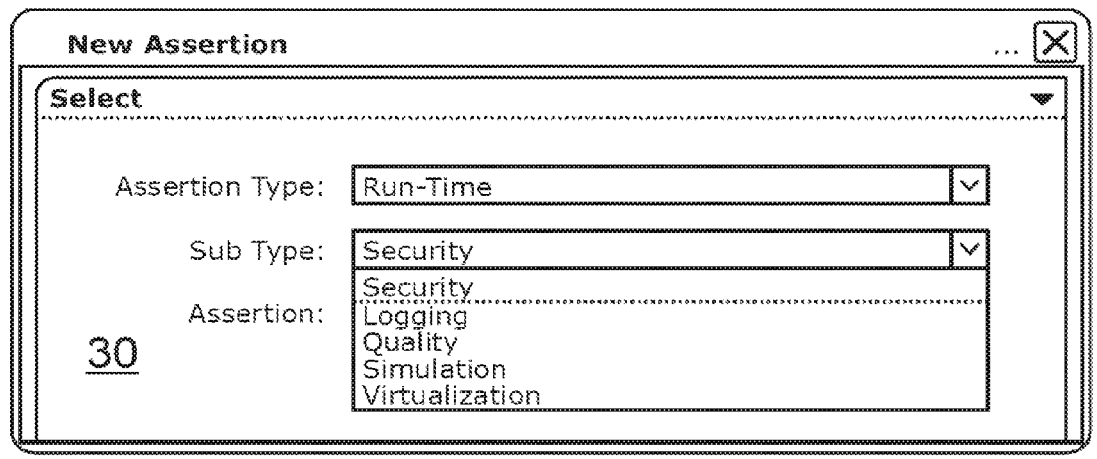
Figure 4B:
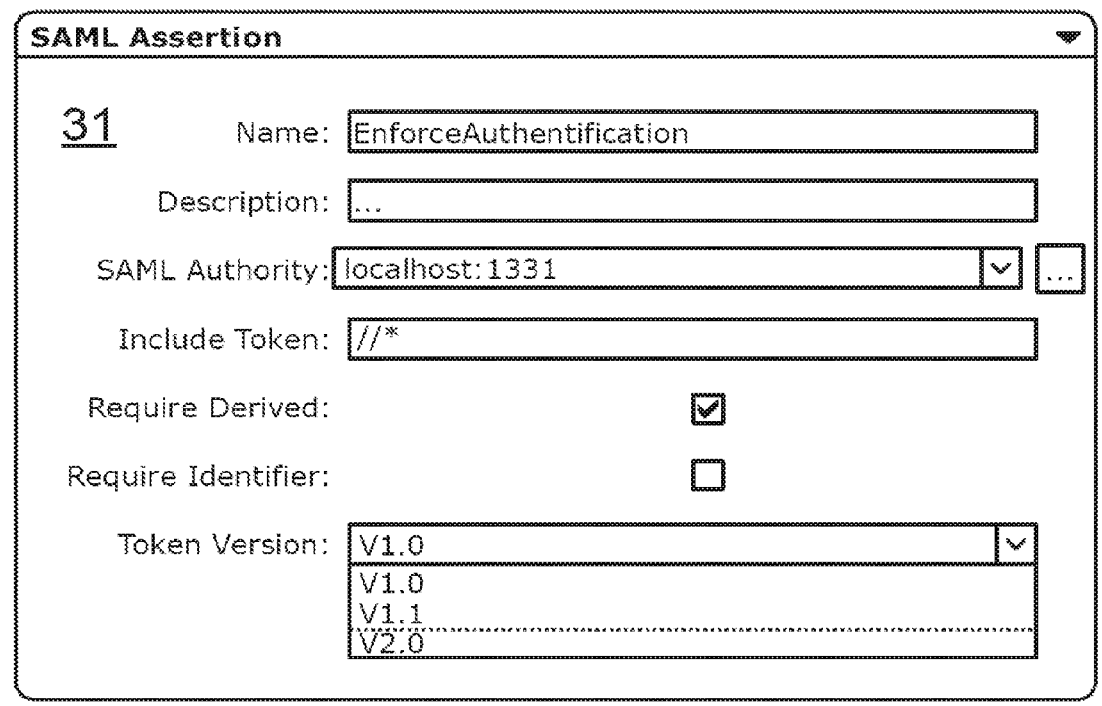

In the following detailed description presently preferred embodiments of the invention are further described with reference to the following figures:

FIG. 1: a simplified SOA comprising a plurality of interacting processing objects and its registry, according to one embodiment;

FIG. 2: a WSDL file containing exemplary technical assertions for a SOA object, according to one embodiment;

FIG. 3: an example of a graphical user interface for linking non-formalized requirements and technical assertions in a registry of an exemplary embodiment of the present invention, according to one embodiment; and FIGS. 4a, 4b: Configuration windows for customizing a template of a new technical assertion to be linked to a non-formalized processing requirement within a registry of an embodiment of the present invention, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 presents an example of a simplified SOA. A process B may call upon execution various other processes BP1 . . . BPn, which in turn may call web services WS1 to WSn. The operational dependencies between the web services of the SOA shown in FIG. 1 are simplified. For example, there might be a process BPx calling during execution not only a single but a plurality of web services WSx, WSy, WSz (not shown in FIG. 1). In the exemplary SOA of FIG. 1, each of the SOA objects may be provided with a policy P. However, this is not essential. On the contrary, only a subset of the objects of the SOA may be provided with a policy or a single object may have more than one assigned policy. Each policy P may include one or more low-level technical assertions.

The assertions for at least some of the objects of the SOA may relate to different technical aspects of the processing. A policy of an SOA object may, for example, contain assertions relating to the authentication, the authorization, encryption, signing, its availability, response time, the throughput, the number of concurrent users, etc. All or some of the assertions of the various policies may be stored in the registry 10 (cf. the dashed arrows of FIG. 1).

FIG. 2

FIG. 2 illustrates an example how the low-level technical assertions can be realized by presenting an example of a part of a WSDL file used for the description of a web service of the SOA. As can be seen in FIG. 2, the highlighted part of the WSDL file may include several technical assertions 15 made for the respective web service such as an acknowledge interval of 200 ms. It is apparent that correctly defining such technical assertion requires considerable IT skills.

Many high-level users of an SOA, for example natural scientists using an SOA based simulation software or business personnel managing a business process using an SOA, do not have such IT skills. Ordinary IT personnel may generally be qualified to make the necessary definitions in such a WSDL file. However, such persons typically lack the understanding of the scientific or business process to be performed by the SOA and can therefore not define meaningful technical assertions useful for the overall process.

The present invention therefore may use the central registry and repository 10 for storing both the non-formalized operational requirements for the various SOA objects and the corresponding technical assertions, e.g., suitable WSDL files. Additional information may be stored in the registry 10, which links the elements of the two groups. As explained below with respect to FIG. 3, informally stated operational requirements expressed in a high-level user-oriented language can thus be transformed in a step-wise manner into a technical assertion that can eventually be processed by dedicated software components for their enforcement.

The step-wise transformation using at least one intermediate representation keeps track of the relationship between all representations. It allows for capturing non-formalized operational requirements that might not (yet) have a pre-defined low-level technical assertion. It is useful to capture such "missing links" for documentation purposes and to care for the case that later on a corresponding low-level representation becomes available. The intermediate representation has the additional advantage that it can be understood and inspected both by IT technicians and high-level users.

The basis for the transformation process may be a taxonomy having as its leaves the low-level technically enforceable assertions. The taxonomy may be stored in the central registry and repository 10. The taxonomy may combine all such technical assertions and groups them into domains like "run-time" or "design-time" or "changes", etc. Linked to the technical assertions may be comprehensible descriptions of the kind of processing constraint they represent (e.g. "maximum response time"). Further, a "free text" entry may be allowed within some domains. For each of such low-level technical assertion, there may be a dedicated translator component attached to the taxonomy, which allows generating a readable representation out of the low-level representation. Thus, even a technically inexperienced user can assess whether the originally non-formalized operational requirements have been correctly transformed.

The reversed process of generating low-level technical assertions for a given non-formalized requirement is explained with reference to the graphical user interface (GUI) provided by the registry 10 and shown in FIG. 3. The transformation may begin with an unstructured statement, e.g., a word-processing file 21. The word processing file 21 may be stored in the central registry 10, where it can be attached to the SOA objects it applies to (not shown in FIG. 3), since the SOA objects may be represented in the registry 10 as well. This is made possible by the data model of the registry 10 allowing the creation of associations between the informal statements of operational requirements and one or more SOA objects.

As shown in FIG. 3, a part 25 of the informal document 21 comprising non-formalized requirements can be highlighted. In a related window 28 of the GUI 20, the user can construct one or more semi-formal representations 29 out of the highlighted part 25 of the requirements document 21. This is another example of the intermediate representation mentioned above.

In one embodiment, the linking between the part 25 and a corresponding assertion is done by selecting the domain(s), to which the document part 25 relates (from the aforementioned taxonomy), and by selecting the appropriate low-level technical assertion. Such a selection may involve the display of a template for the new assertion, which can then be filled in with one or more parameters to reflect the specific operational requirement. FIGS. 4a and 4b present exemplary windows 30 and 31 for customizing such a template of the "run-time" domain having a number of input possibilities for various parameters.

The part 25 in the informal document 21 can result in multiple low-level technical assertions 29, which can be combined by Boolean expressions "AND", "OR", etc. (not shown in FIG. 3). The low-level technical assertions 29 resulting from customizing the templates may also be stored in the registry and attached to the same SOA object. In addition, these assertions may be linked to the highlighted part 25 of the document containing the original non-formalized operation requirement.

The described transformation process could also be a multi-level process, wherein the non-formal requirements document may be at first transformed to a first intermediate representation, which in another transformation step may become more formalized in a second intermediate representation until eventually the low-level technical assertion is obtained.

Regardless of the number of intermediate representations, the whole transformation process allows for checking and validation of the translation from a non-formalized to a formalized and machine-enforceable representation and for easily identifying the low-level constraints to be adapted on change of the high-level requirements.

In one embodiment, the unstructured text of the part 25 could be analyzed by a text mining functionality to find passages that might be relevant for the transformation into lower level assertions. These passages can be highlighted and automatically annotated with one or more appropriate low level assertions. These proposals may then be verified or corrected by a user.

In another embodiment, an informal operational requirements document relates to a set of SOA objects, either to a type of SOA objects (e.g. applies to all web services) or to a "vertical" group of interacting SOA objects (e.g. an overall process, two web services exposing this process, and an application server where the web services are deployed). The above described transformation process allows in such a situation to relate the passages in the informal text to technical assertions attached to multiple SOA objects.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory memory medium storing a registry for a service oriented architecture (SOA) comprising a plurality of processing objects, wherein the plurality of processing objects comprise a plurality of SOA objects, the registry including:
    Web Services Description Language (WSDL) descriptions of the plurality of SOA objects;
    a plurality of non-formalized operation requirements for the plurality of SOA objects;
    a plurality of technical assertions for the plurality of SOA objects; and
    a plurality of links, linking each non-formalized operation requirement to at least one technical assertion of the registry;
    for at least one link, an intermediate representation of the respective non-formalized operation requirement, wherein the intermediate representation is human readable and comprises a semi-formal representation intermediate to the respective non-formalized operation requirement and a corresponding technical assertion;
    a graphical user interface presenting at least one non-formalized operation requirement and an intermediate representation of at least one linked technical assertion, wherein the graphical user interface is usable to:
        link at least two technical assertions to the same non-formalized operation requirement; and
        combine at least two technical assertions using Boolean expressions;
    wherein the registry comprises at least one link linking a single non-formalized operation requirement to technical assertions valid for at least two of the SOA objects; and
    wherein the registry is adapted to be used for transforming non-formalized operation requirements into technical assertions in a step-wise manner using at least one intermediate representation.

2. The non-transitory memory medium of claim 1, wherein the registry further comprises an intermediate representation of at least one non-formalized operation requirement which is not linked to a technical assertion.

3. The non-transitory memory medium of claim 1, wherein the graphical user interface is usable to present a template for the selection of an appropriate technical assertion to be linked to a non-formalized operation requirement.

4. The non-transitory memory medium of claim 1, wherein the registry further comprises a taxonomy grouping the technical assertions for the plurality of SOA objects into domains.

5. The non-transitory memory medium of claim 1, wherein the plurality of non-formalized operation requirements, the plurality of technical assertions, and the plurality of links are useable for managing operational requirements of a service oriented (software) architecture (SOA).

6. The non-transitory memory medium of claim 1, wherein the plurality of non-formalized operation requirements, the plurality of technical assertions, and the plurality of links enable a high-level user to control the operation of the processing objects of the SOA by referring only to the non-formalized operation requirements without having to use the technical assertions.

7. A method for managing operational requirements of a service oriented (software) architecture (SOA) comprising a plurality of processing objects, wherein the plurality of processing objects comprise a plurality of SOA objects, the method comprising:
   utilizing a computer to perform:
      storing Web Services Description Language (WSDL) descriptions of the plurality of SOA objects;
      storing a plurality of non-formalized operation requirements for the plurality of SOA objects;
      storing a plurality of technical assertions for the plurality of SOA objects; and
      storing a plurality of links, linking each non-formalized operation requirement to at least one technical assertion, including at least one link linking a single non-formalized operation requirement to technical assertions valid for a plurality of SOA objects; and
      storing, for at least one link, an intermediate representation of a respective non-formalized operation requirement, wherein the intermediate representation is human readable and comprises a semi-formal representation intermediate to the respective non-formalized operation requirement and a corresponding technical assertion;
      displaying a graphical user interface, wherein the graphical user interface is usable to:
         display information regarding the plurality of non-formalized operation requirements, the plurality of technical assertions, and/or the plurality of links;
         receive user input linking at least two technical assertions to the same non-formalized operation requirement, wherein the user input comprises using one or more Boolean expressions; and
         combine at least two technical assertions using the Boolean expressions in response to the user input;
      wherein the Web Services Description Language (WSDL) descriptions, the plurality of non-formalized operation requirements, the plurality of technical assertions, the intermediate representation of the respective non-formalized operation requirement, and the plurality of links are useable for managing operational requirements of the service oriented (software) architecture (SOA); and
      wherein the Web Services Description Language (WSDL) descriptions, the plurality of non-formalized operation requirements, the plurality of technical assertions, and the plurality of links are useable for transforming non-formalized operation requirements into technical assertions in a step-wise manner using at least one intermediate representation.

8. The method of claim 7, wherein the graphical user interface is useable to perform modification of the technical assertions and/or the non-formalized operation requirements of the SOA objects.

9. The method of claim 7, wherein the graphical user interface is useable to define operational requirements for the SOA objects using Boolean expressions.

10. The method of claim 7, further comprising:
   utilizing the computer to perform:
      for at least one link, storing an intermediate representation of at least one non-formalized operation requirement which is not linked to a technical assertion.

11. The method of claim 7, further comprising:
   displaying a template in the graphical user interface, wherein the template is useable for selection of an appropriate technical assertion to be linked to a non-formalized operation requirement.

12. A method for managing operational requirements of a service oriented (software) architecture (SOA) comprising a plurality of processing objects, wherein the plurality of processing objects comprise a plurality of SOA objects, the method comprising:
   utilizing a computer to perform:
      storing Web Services Description Language (WSDL) descriptions of the plurality of SOA objects;
      storing a first non-formalized operation requirement for a first SOA object;
      storing a plurality of technical assertions for the plurality of SOA objects, including a first technical assertion for the first SOA object, wherein the first technical assertion is created based on the first non-formalized operation requirement;
      storing an intermediate representation of the non-formalized operation requirement, wherein the intermediate representation is human readable and comprises a semi-formal representation intermediate to the non-formalized operation requirement and the first technical assertion; and
      creating a link that links the first non-formalized operation requirement to technical assertions valid for a plurality of SOA objects, including the first technical assertion for the first SOA object;
      wherein the link enables a user to manage the first technical assertion based on the first non-formalized operation requirement; and
      wherein the Web Services Description Language (WSDL) descriptions, the first non-formalized operation requirement, the plurality of technical assertions, and the link are useable for transforming non-formalized operation requirements into technical assertions in a step-wise manner using at least one intermediate representation;
      displaying a graphical user interface, including presenting at least one non-formalized operation requirement and an intermediate representation of at least one linked technical assertion, wherein the graphical user interface is usable to:
         link at least two technical assertions to the same non-formalized operation requirement; and
         combine at least two technical assertions using Boolean expressions.

* * * * *